(12) United States Patent
Chung et al.

(10) Patent No.: US 12,682,777 B2
(45) Date of Patent: Jul. 14, 2026

(54) APPARATUS FOR SUPPORTING LEARNING BASED ON REAL TIME BRAIN WAVE AND LEARNING STATE AND OPERATION METHOD FOR THE SAME

(71) Applicant: SEOUL NATIONAL UNIVERSITY R&DB FOUNDATION, Seoul (KR)

(72) Inventors: Chun Kee Chung, Seoul (KR); June Sic Kim, Seoul (KR); Youmin Shin, Seoul (KR); Jii Kwon, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 349 days.

(21) Appl. No.: 18/537,036

(22) Filed: Dec. 12, 2023

(65) Prior Publication Data

US 2024/0221519 A1 Jul. 4, 2024

(30) Foreign Application Priority Data

Dec. 29, 2022 (KR) ......................... 10-2022-0189277

(51) Int. Cl.
*G09B 5/06* (2006.01)
*G06F 3/01* (2006.01)

(52) U.S. Cl.
CPC ............. *G09B 5/065* (2013.01); *G06F 3/015* (2013.01)

(58) Field of Classification Search
CPC .. G06F 3/01; G06F 3/015; G09B 5/06; G09B 5/065
See application file for complete search history.

(56) References Cited

U.S. PATENT DOCUMENTS 8,744,855 B1 * 6/2014 Rausch .................. G09B 19/06
434/156
11,545,046 B2 * 1/2023 Nel .......................... G06N 3/09

FOREIGN PATENT DOCUMENTS

| KR | 10-0508885 B1 | 8/2005 |
| KR | 10-2011-0024493 A | 3/2011 |
| KR | 10-2213476 B1 | 2/2021 |
| KR | 10-2265734 B1 | 6/2021 |
| KR | 10-2021-0116888 A | 9/2021 |

* cited by examiner

*Primary Examiner* — Timothy A Musselman
(74) *Attorney, Agent, or Firm* — Dinsmore & Shohl LLP; Yongsok Choi, Esq.

(57) ABSTRACT

A learning support apparatus according to an embodiment of the present disclosure may include a processor; and a memory electrically connected to the processor and storing at least one code executed by the processor, in which when the memory is executed through the processor, the processor may measure a first brain wave signal in a resting state of a subject, and measures a second brain wave signal in a learning state of test content, determine a learning state measurement index of the subject, determine a learning success criterion of the subject, measure a third brain wave signal of the subject while learning content is provided to the subject, and store a code causing to determine a learning policy for the learning content based on a result of analyzing the third brain wave signal using learning success criterion and the learning state measurement index.

8 Claims, 4 Drawing Sheets

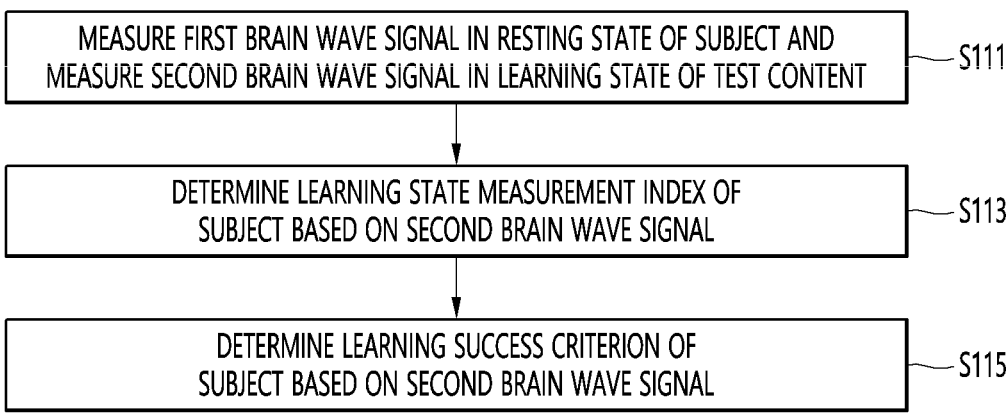

MEASURE FIRST BRAIN WAVE SIGNAL IN RESTING STATE OF SUBJECT AND MEASURE SECOND BRAIN WAVE SIGNAL IN LEARNING STATE OF TEST CONTENT — S111

DETERMINE LEARNING STATE MEASUREMENT INDEX OF SUBJECT BASED ON SECOND BRAIN WAVE SIGNAL — S113

DETERMINE LEARNING SUCCESS CRITERION OF SUBJECT BASED ON SECOND BRAIN WAVE SIGNAL — S115

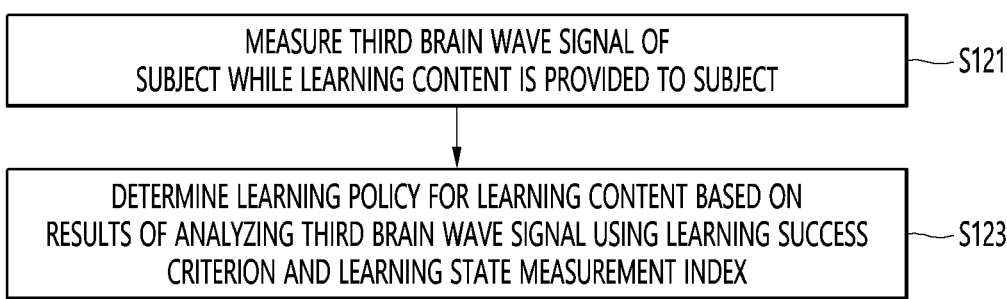

MEASURE THIRD BRAIN WAVE SIGNAL OF SUBJECT WHILE LEARNING CONTENT IS PROVIDED TO SUBJECT — S121

DETERMINE LEARNING POLICY FOR LEARNING CONTENT BASED ON RESULTS OF ANALYZING THIRD BRAIN WAVE SIGNAL USING LEARNING SUCCESS CRITERION AND LEARNING STATE MEASUREMENT INDEX — S123

APPARATUS FOR SUPPORTING LEARNING BASED ON REAL TIME BRAIN WAVE AND LEARNING STATE AND OPERATION METHOD FOR THE SAME

CROSS-REFERENCE TO RELATED APPLICATION

This application is based on and claims priority under 35 U.S.C. § 119 to Korean Patent Application No. 10-2022-0189277, filed on Dec. 29, 2022, in the Korean Intellectual Property Office, the disclosure of which is incorporated by reference herein in its entirety.

BACKGROUND

1. Field

The present disclosure relates to an apparatus and a method for supporting learning of a learner, and more specifically, relates to a learning support apparatus and operating method in which a possibility of success and a learning state of learning content are measured based on a brain wave of the learner in real time, and a learning policy for the learning content is determined accordingly.

2. Description of the Related Art

Technology exists to provide various learning contents online.

Conventional technology that provides learning content mainly determines how to configure the learning content based on learning performance results for the learning content of the learner. For example, in a case of math problems, a lot of mistakes occur in math problems in a specific unit, re-learning of the unit is determined or a difficulty level of the problems is adjusted.

In addition, in the case of prior art 1, it is a technology that predicts the probability of correct answer of the user to a specific problem and recommends learning content according to a user feature model. However, since prior art 1 is a learning content recommendation system that identifies and reflects user features at the post-learning evaluation step, not the learning step of the user, the reflection cannot be performed in real time.

In other words, all conventional technologies of providing learning content determine policies for providing learning content based on the results of completed learning, and thereby there is a problem that takes a long time to improve the learning success possibility of the learner and learning interest. In particular, in a case of learning content where it is difficult to immediately check the learning completion result, for example, in a case of 'word memory', there is a drawback in that it is difficult to change the policy for providing learning content based on the learning completion result.

In addition, the evaluation of the learning success of learning content such as lecture videos that do not produce learning results such as problems also has a drawback of evaluating the success of learning performance in an indirect method, such as based on the results of solving problems related to the lecture.

Therefore, there is a need for technology that may change the policy for providing learning content through evaluating the learning success possibility of the user in real time during learning.

Prior Art 1: Korean Patent Publication No. 10-2213476 (Feb. 8, 2021)

SUMMARY

Embodiments of the present disclosure provide an apparatus and a method for determining a policy for providing learning content to improve learning efficiency by measuring a learning success potential and learning state of learning content based on the brain wave s of the user who performs learning.

Embodiments of the present disclosure may appropriately determine a learning policy for learning content depending on whether the classification of learning content is text-based or video-based.

The object of the present disclosure is not limited to the problems mentioned above, and other objects and advantages of the present disclosure that are not mentioned may be understood through the following description and will be more clearly understood through examples of the present disclosure. In addition, it will also be appreciated that the objects and advantages of the present disclosure may be realized by means and combinations thereof as set forth in the claims.

An operation method for a learning support apparatus according to an embodiment of the present disclosure, may include measuring a first brain wave signal in a resting state of a subject, and measuring a second brain wave signal in a learning state of test content, determining a learning state measurement index of the subject based on the second brain wave signal, determining a learning success criterion of the subject based on the second brain wave signal classified into learning success and learning failure for the test content of the subject, measuring a third brain wave signal of the subject while learning content is provided to the subject, and determining a learning policy for the learning content based on a result of analyzing the third brain wave signal using learning success criterion and the learning state measurement index.

A learning support apparatus according to an embodiment of the present disclosure may include a processor; and a memory electrically connected to the processor and storing at least one code executed by the processor, in which when the memory is executed through the processor, the processor may measure a first brain wave signal in a resting state of a subject, and measures a second brain wave signal in a learning state of test content, determine a learning state measurement index of the subject based on the second brain wave signal, determine a learning success criterion of the subject based on the second brain wave signal classified into learning success and learning failure for the test content of the subject, measure a third brain wave signal of the subject while learning content is provided to the subject, and store a code causing to determine a learning policy for the learning content based on a result of analyzing the third brain wave signal using learning success criterion and the learning state measurement index.

The learning support apparatus and the method for the same according to embodiments of the present disclosure may efficiently improve learning efficiency by providing appropriate learning content based on the learning state or learning success probability measured in real time while the user performs learning.

The effects of the present disclosure are not limited to those mentioned above, and other effects not mentioned will be clearly understood by those skilled in the art from the description below.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 3 and 4 are flowcharts for explaining an operation method for the learning support apparatus according to an embodiment of the present disclosure;

DETAILED DESCRIPTION

Figure 1:
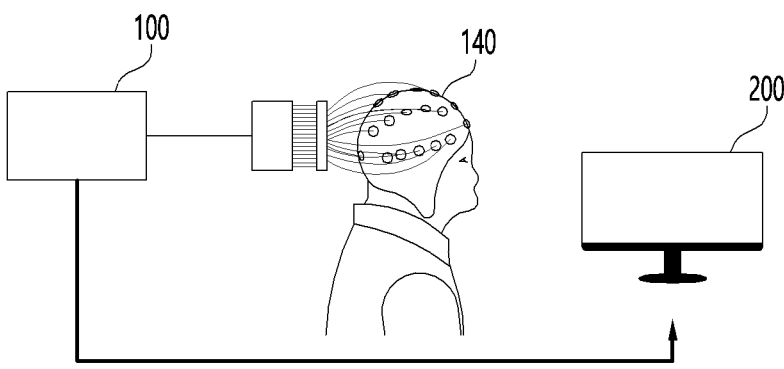
FIG. 1 is a diagram illustrating an environment for performing a learning support method or driving a learning support apparatus according to an embodiment of the present disclosure.

Hereinafter, embodiments disclosed in this specification will be described in detail with reference to the attached drawings. However, identical or similar components will be assigned the same reference numbers regardless of drawing symbols, and duplicate descriptions thereof will be omitted. The suffixes "module" and "portion" for components used in the following description are given or used interchangeably only for the ease of preparing the specification, and do not have distinct meanings or roles in themselves. Additionally, in describing the embodiments disclosed in this specification, if it is determined that detailed descriptions of related known technologies may obscure the gist of the embodiments disclosed in this specification, the detailed descriptions will be omitted. In addition, the attached drawings are only for easy understanding of the embodiments disclosed in this specification, and the technical idea disclosed in this specification is not limited by the attached drawings, and all changes included in the spirit and technical scope of the present disclosure are not limited and should be understood to include equivalents or substitutes.

Terms including ordinal numbers, such as first, second, etc., may be used to describe various components, but the components are not limited by the terms. The above terms are used only for the purpose of distinguishing one component from another.

When a component is said to be "connected" or "coupled" to another component, it should be understood that it may be directly connected to or coupled to the other component, but that other components may exist therebetween. On the other hand, when it is mentioned that a component is "directly connected" or "directly coupled" to another component, it should be understood that there are no other components therebetween.

An environment for executing a learning support apparatus according to an embodiment of the present disclosure may include a learning support apparatus 100, a network, a subject, and a learning support server.

The learning support apparatus 100 may receive learning success criterions for evaluating a possibility of learning success from the server and evaluate the possibility of learning success or a learning state from the brain wave signals of the subject.

The learning support apparatus 100 may determine a learning policy that determines the content displayed on the learning content providing apparatus 200 of the subject.

The disclosures of this specification explain that the learning support apparatus 100 measures the brain wave signal of the subject, measures the success of the learning content and the learning state of the subject based on the brain wave signal, and determines the learning policy for the learning content. However, a separate server may exist and some steps and configurations may be performed on the server or implemented separately as a configuration of the server. For example, there may be a separate server that provides learning content, or a separate server that determines learning success criterions.

In one embodiment, the learning support apparatus 100 may analyze the brain wave signal of the subject in a manner of analyzing pre-processed input data of the brain wave signal received from the subject and calculating a value of a specific index. Analysis of the brain wave signals may mean analyzing not only brain activity, such as the intensity of brain wave s in a specific region of the brain wave or a specific frequency band, but also features of brain network connectivity.

The terms "brain wave" and "brain wave signal" used herein refer to electric or magnetic signals that change depending on the activation and state of the brain of the user. The brain wave is a comprehensive term that refers to electric or magnetic signals generated by neural activity in the brain, such as electroencephalogram (EEG), electrocorticogram (ECoG), or magnetoencephalogram (MEG).

The learning support apparatus 100 may provide test content to the subject in a preparation step described with reference to FIG. 3 and determine indexes that serve as criterions for evaluating the subject while performing the learning content based on the brain wave signal of the subject measured through a brain signal measurement unit 140 and the brain wave signal measured in the resting state of the subject.

The learning support apparatus 100 may provide learning content to the subject in the step of performing learning about the learning content described with reference to FIG. 4 and compare a value for analyzing the brain wave signal of the subject measured in real time through the brain signal measurement unit 140 with an index generated in the preparation step to determine the learning policy for the learning content.

In this specification, the learning success criterion may mean the value of a specific feature of the brain wave signal, or may be a classifier model learned based on machine learning or deep learning using values of a plurality of features.

Figure 2:
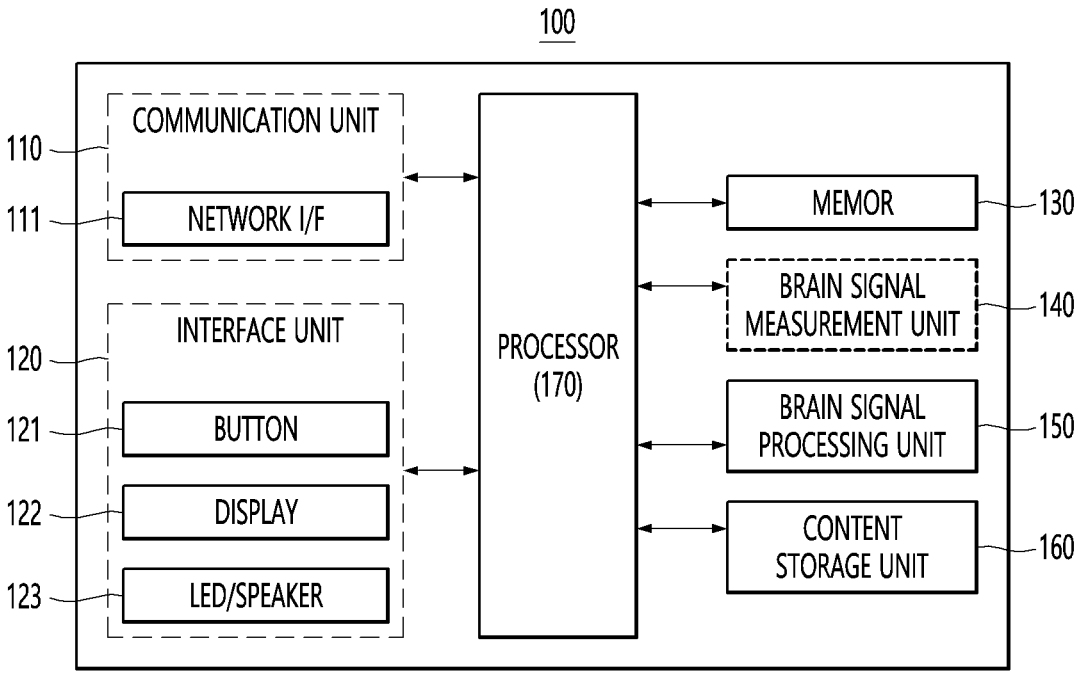
FIG. 2 is a block diagram illustrating a configuration of the learning support apparatus according to an embodiment of the present disclosure.

The configuration of the learning support apparatus 100 according to an embodiment of the present disclosure will be described with reference to FIG. 2.

The learning support apparatus 100 includes a communication unit 110 that receives learning success criterions from a server or content such as learning content, an interface unit 120 for control or interfacing of the subject, a memory 130 that stores a code that controls a processor 170 to perform operations according to embodiments of the present disclosure, content, a learning model, or a learning success criterion received from the server, a brain signal measurement unit 140 that measures the brain wave signal from the subject in real time, a brain signal processing unit 150 that pre-processes the brain wave signal measured from the subject, and a content storage unit 160 that stores content. The interface unit 120 may include a button 121, a display 122, and an LED/speaker 123.

In one embodiment, the brain signal measurement unit 140 may include electrodes for measuring the brain wave type brain wave signals in the form of the ECOG and the brain wave, or convert the brain wave signals measured from a separate brain wave signal measurement apparatus (nerve signals related to the brain) into electrical or digital signals, and then receive the signals wired or wirelessly.

In addition, the brain signal measurement unit 140 may convert magnetic brain nerve signals measured from a magnetoencephalography (MEG) measurement apparatus into electrical or digital signals and then receive the signals wired or wirelessly.

In addition, the brain signal measurement unit 140 may include a light source and a detector for near infrared spectroscopy (NIRS) measurement, or convert the brain nerve signals measured from a separate NIRS measurement apparatus into an electrical or digital signal and then receive the signals wired or wirelessly.

The brain wave signal may be a signal obtained from a plurality of brain regions of the subject.

As an example, the brain wave signals may be brain wave signals obtained from the occipital lobe and temporal lobe in each of the left and right hemispheres of the brain.

The brain signal processing unit 150 may include an analog front-end portion and a digital filter, including a low noise amplifier (LNA) and an analog-digital converter (ADC) to amplify the brain wave signal, or include a digital filter or a digital pre-processing module for receiving brain wave signals as digital signals.

The brain signal processing unit 150 may perform noise removal, filtering, and epoching.

The brain signal processing unit 150 may perform removing of 60 Hz power noise using a notch filter or band-pass filtering for each band estimated to be related to a specific cognitive function using a band-pass filter.

The brain signal processing unit 150 may cut the brain wave signal from which noise is removed into specific sections (for example, brain wave signals from the presentation of learning content to a certain time period) to facilitate analysis, perform epoching to enable signal processing, perform normalization to decrease a difference between brain wave signals between people and a difference between brain wave signals within a person, and perform down sampling to prevent over-fitting. Epoching may be performed in tens of milliseconds to seconds for data processing.

The processor 170 may analyze brain network connectivity of the brain wave signals obtained from a plurality of brain regions of the subject, determine the amount of activity of a specific region of the brain wave signal, or calculate a value of a specific feature of the brain wave signal.

When determining the concentration of the subject, delta power, theta power, beta power of the occipital lobel of the subject, and beta power of the temporal lobe may be obtained.

The value of each feature may use values of the measured features themself, or a value scaled between 0 and 1.

In one embodiment, when using brain network connectivity, brain network connectivity may be based on mutual information, and in addition to mutual information, brain network connectivity may be based on a brain model of functional connectivity using indexes such as Dynamic Causal Modeling (DCM), coherence, and partial directed coherence, and neurophysiology-basis such as betweeness, centrability, degree of node, and small worldness.

When using brain network connectivity, the processor 170 may generate input data by expressing the connectivity values of the brain wave signals obtained from a plurality of brain regions of the subject as a matrix. Therefore, data processing between the plurality of brain regions may be easily performed.

The processor 170 may use mutual information as a metric for non-linear statistical dependence between signals in a pair of cortical regions of interest (ROI). For example, a total of 91 edges may exist between a total of 14 regions of interest.

When using the feature of the brain wave signal, the processor 170 may determine the amount of activity in a specific region of the brain wave signal based on the mean, median, maximum, or minimum of power of the theta, alpha, beta, or gamma bands in the brain wave signal.

The learning support apparatus 100 may include a communication unit 110 for communicating with a server.

The communication unit 110 may include a wireless communication unit or a wired communication unit. The communication unit 110 includes a network interface 111.

The wireless communication unit may include at least one of a mobile communication module, a wireless Internet module, a short-range communication module, and a position information module.

The mobile communication module transmits and receives wireless signals with at least one of a base station, an external terminal, and a server on a mobile communication network built according to LTE (Long Term Evolution) that is a communication method for mobile communication.

The wireless Internet module is a module for wireless Internet access and may be built into or external to the learning support apparatus 100, and WLAN (Wireless LAN), Wi-Fi (Wireless-Fidelity), Wi-Fi (Wireless Fidelity) Direct, DLNA (Digital Living Network Alliance), etc. may be used.

The short-range communication module is a module for transmitting and receiving data through short-range communication, and Bluetooth™, RFID (Radio Frequency Identification), Infrared Data Association (IrDA), UWB (Ultra Wideband), ZigBee, and NFC (Near Field Communication), etc. may be used.

The location information module is a module for acquiring the position of the learning support apparatus 100, and may be a GPS (Global Positioning System) module based on satellite navigation technology, or a module acquiring the position based on wireless communication with a wireless communication base station or wireless access point. The position information module may include a WiFi module.

The learning support apparatus 100 may include an input unit for input from a subject or operator or an output unit.

The input unit may include a user interface (UI) including a microphone and a touch interface for receiving information from the user, and the user interface may include a mouse, a keyboard, as well as mechanical and electronic interfaces implemented in the apparatus, and as long as the command of the user may be input, the method and form are not particularly limited. The electronic interface includes a display capable of touch input.

The output unit is used to deliver information to the user by displaying the output of the learning support apparatus 100 to the outside, and may include a display, LED, speaker, etc. for displaying visual output, auditory output, or tactile output.

The learning support apparatus 100 may include a peripheral apparatus interface unit for data transmission with various types of connected external apparatuses, a memory card port, an external apparatus I/O (Input/Output) port, etc.

An operation method for the learning support apparatus 100 according to an embodiment of the present disclosure will be described with reference to FIGS. 3 and 4.

With reference to FIG. 3, the learning support apparatus 100 may measure the learning state measurement index of the subject as a preparation step before learning the learning content to be learned by the subject, and determine the learning success criterion (S110).

With reference to FIG. 4, the learning support apparatus 100 may measure the brain wave signal of the subjects in real time while the subject is performing the learning content provided, and analyze the brain wave signals in real time based on learning state measurement index and learning success criterion to determine the learning policy for the learning content.

With reference to FIG. 3, a method (S110) of determining the learning state measurement index of the learning support apparatus 100 and determining the learning success criterion will be described.

The learning support apparatus 100 measures a first brain wave signal in a resting state in which no content is provided to the subject, and measures a second brain wave signal in a learning state of test content (S111).

The learning support apparatus 100 determines the learning state measurement index based on the second brain wave signal measured in a state where the subject learns the test content.

The learning state measurement index operates as a criterion for an emotional or mental state in which the subject performs learning, and in one embodiment, may be based on the concentration of the subject and VAD (Valence, Arousal, Dominance). VAD is explained below with reference to FIG. 6.

In one embodiment, the concentration (Attn_std) of the learning state measurement index may be the value of delta power of the occipital lobe when the subject is maximally focused among the second brain wave signal measured while learning test content. In one embodiment, the concentration of the learning state measurement index may be the value of delta power, which is the minimum in the occipital lobe, among the second brain wave signals measured in a state where the subject learns the test content. As another example, theta power or beta power may be used as previously described.

Figure 6:
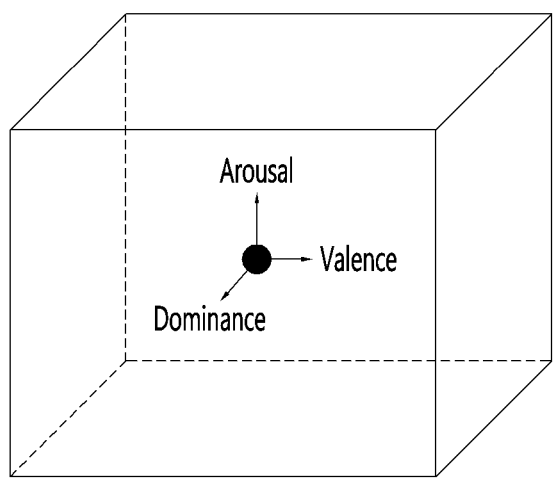
FIG. 6 is a diagram for explaining a VAD value that is one of indexes for evaluating the learning state.

In one embodiment, the VAD (VAD_std) of the learning state measurement index may be the average vector of the VAD, which will be described with reference to FIG. 6 below, and is the average vector of the VAD of the second brain wave signal measured in a state where the subject learns the test content, or the VAD vector at maximum concentration.

The learning support apparatus 100 may measure the value (Rest_std) of delta power of the first brain wave signal measured in the resting state. As another example, theta power or beta power may be used as previously described. This value may be used to scale the concentration (Attn_t) measured while the subject performs the learning content.

The learning support apparatus 100 may determine the learning success criterion of the subject based on the second brain wave signal classified into learning success and learning failure for the test content (S115).

In one embodiment, when the learning success criterion is determined as the value of a specific feature, a plurality of test content are respectively classified into success cases and failure cases according to the success or failure of the subject in learning, and then the success case may be determined by the average value of the specific features in the success classification and the failure case may be determined by the average value of the specific features in the failure classification.

The failure may be theta power, alpha power, beta power, or gamma power previously described, or may be brain network connectivity.

The feature may include indexes representing brain activity in a specific region and a specific frequency band using FFT (fast Fourier transform), CWT (continuous wavelet transform), ERP (event related potential), and Hilbert transform, as well as functional connectivity using indexes such as coherence, mutual information, and partial directed coherence, and the brain network feature such as betweenness, centrality, degree of node, and smallswords.

In one embodiment, the learning success criterion may be a classifier or a learning model trained using specific features in success classification and specific features in failure classification based on machine learning or deep learning. For example, the learning success criterion may be a classifier or a learning model such as a SVM (support vector machine), RF (random forest), or CNN (convolutional neural network) trained using theta power labeled as the success classification and the failure classification as training data.

The learning support server may create a learning model based on supervised learning or unsupervised learning.

The learning model may be based on regression methods such as Support Vector Machine (SVM), artificial neural network based on deep learning, Multiple Linear Regression, and Linear Regression, and may be supervised. There is no limitation to the model creation method such as Supervised Learning, Unsupervised Learning, or Semi-supervised Learning.

The learning models based on machine learning may include CNN, R-CNN (Region based CNN), C-RNN (Convolutional Recursive Neural Network), Fast R-CNN, Faster R-CNN, R-FCN (Region based Fully Convolutional Network). YOLO (You Only Look Once), or SSD (Single Shot Multibox Detector)-structured neural networks, or a neural network of an SSD (Single Shot Multibox Detector) structure, or a time-series-based neural network such as RNN (Recurrent neural network) and LSTM (Long Short-Term Memory).

The learning model may be implemented in hardware, software, or a combination of hardware and software. If part or all of the learning model is implemented in software, one or more instructions constituting the learning model may be stored in a memory.

With reference to FIG. 4, a method in which the learning support apparatus 100 determines the learning policy for the learning content by analyzing the brain wave signals measured in real time from the subject while the subject performs the learning content (S120) will be described.

The learning support apparatus 100 provides the learning content to the subject or measures the third brain wave signal of the subject while learning content is provided to the subject from a separate apparatus (S121).

The learning support apparatus 100 determines the learning policy for the learning content based on the results of analyzing the third brain wave signal using the learning state measurement index of the subject and learning success criterions determined in the preparation step S110 (S123).

The learning policy and the method for determining the learning policy may be applied differently depending on the category of the learning content, for example, whether it is text-based learning content or video-based learning content.

Figure 5:
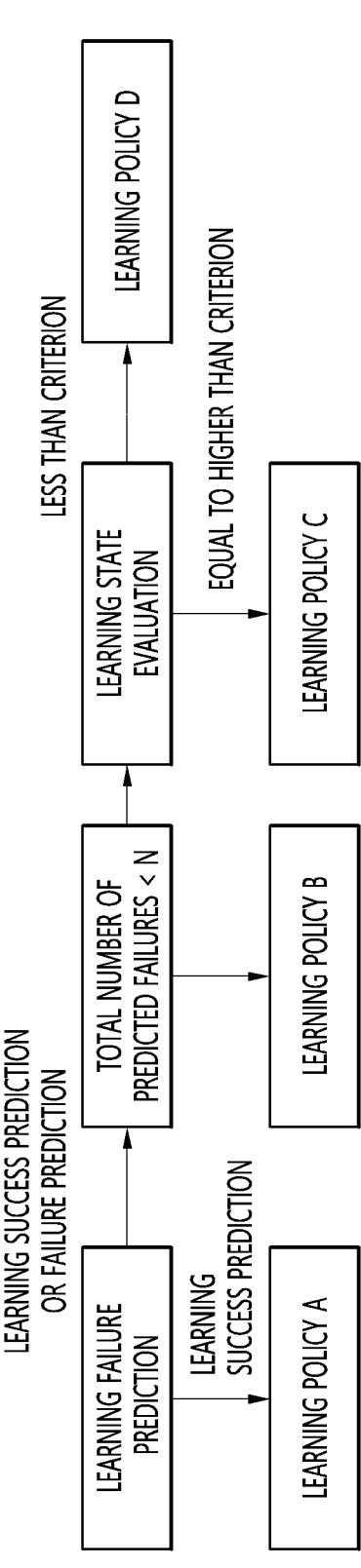
FIG. 5 is a diagram for explaining a learning policy for text-based learning content according to an embodiment of the present disclosure.

With reference to FIG. 5, the learning policy in the case of the text-based learning content and an embodiment of determining the learning policy will be described.

With reference to FIG. 5, learning policies in the case of text-based learning content may be divided into four types.

A learning policy A is a policy adopted when the subject is predicted to succeed in learning by comparing the third brain wave signal with the learning success criterion.

For example, if the learning success criterion is determined by the value of a specific feature (e.g., theta power), a case where the value of theta power measured from the third brain wave signal measured in real time while performing the learning content exceeds the learning success criterion, it is predicted that learning is successful, and the learning policy A may be adopted. Alternatively, if the learning success criterion is the classifier or the learning model, a case where the values of features measured from the third brain wave signal or data preprocessed from the third brain wave signal are input to the classifier or the learning model, it is predicted that learning is successful, and the learning policy A may be adopted.

The learning policy A may decrease a provision ratio of the currently learning content to the total learning contents or increase a difficulty of the total learning contents. For example, learning content for word memory may be configured of a plurality of words, and may be content in which the plurality of words are repeated several times. In this case, if learning (memory) of the currently presented word is predicted to be successful, the provision ratio of learning content for which success is predicted may be decreased by decreasing the number of repetitions of the presented word. Alternatively, as another example, learning content for word memory may increase the level of a plurality of words, that is, the vocabulary difficulty.

The learning policy B is a policy adopted when the subject is predicted to fail learning by comparing the third brain wave signal with the learning success criterion, but the total number of predicted failures including the past failures for the relevant learning content is less than the criterion.

The learning policy B may increase the provision ratio of the currently learning content to the total learning contents or decrease the difficulty of the total learning contents. In other words, it may be to increase the opportunity to learn the learning content currently being studied or to easily change the difficulty level of the total learning contents.

The learning policy C is a case where the subject is predicted to fail learning by comparing the third brain wave signal with the learning success criterion, but the third brain wave signal is above the criterion when comparing with the learning state measurement index determined in the preparation step. For example, the learning policy C is a policy in which the concentration or VAD is above a certain level and the learning state is evaluated as not bad, the provision ratio of the presented learning content may be increased to enhance the opportunity to succeed in the learning content, or the learning content may be stored as an important list to support learning again later.

The learning support apparatus 100 may measure the learning state in real time while learning the learning content and compare the learning state with the learning state measurement index determined in the preparation step.

The learning state may be based on concentration (Attn_t) and VAD (VAD_t) determined in real time while learning the learning content.

The learning state is a value output by inputting concentration (Attn_t) and VAD (VAD_t) into the classification model or the regression model. The classification model or the regression model may be a model trained to output 1 when learning is maximally concentrated, output 0 for the resting state, and output a predicted probability with a value therebetween. The classification model may be based on XGB, SVM, KNN, LGB, CATB, or RF, or the regression model may be a linear regression model or a logistic regression model.

The real-time concentration (Attn_t) may be scaled and then input into the classification model or the regression model. For example, the concentration (Attn_t) may be scaled to a value of (Attn_t−Rest_std)/(Attn_std−Rest_std), scaled by Attn_t/Attn_std, or scaled in various ways.

The real-time VAD (VAD_t) determines the similarity with the VAD (VAD_std) determined in the preparation step, and the similarity may be input into the classification model or the regression model.

The VAD will be described with reference to FIG. 6.

The VAD may refer to an emotional state, and is a method in which features that make up the emotional state are defined as axes and the emotional state is expressed with the feature values. The axis is a vector expressed according to arousal, valence, or dominance.

The arousal is a measure of the degree of emotional excitement. The smaller this value, the calmer the emotion is and may be, for example, boredom, comfort, sleepiness, etc., and may be, vice versa, excitement, anger, fear, etc.

The valence is the degree of positivity or negativity of the emotion. For example, fear has a very negative valence, boredom or excitement has a medium valence, and happiness or comfort has a positive valence.

The dominance is about whether the subject feels the emotional state subjectively. For example, anger is an emotional state in which the subject becomes an object, whereas fear is a passive emotion caused by other factors.

In the method for measuring the VAD, for example, the brain wave signals are collected while watching specific content through 64ch brain wave, noise of the brain wave signals is decreased through an auto encoder, and the VAD may be measured through deep learning analysis of results of performing channel analysis between 64 channels. The inter channel analysis may use PCA (principle component analysis) and PCC (Pearson correlation coefficient) between channels. In addition, conventionally known VAD measurement methods may be used.

The learning support apparatus 100 may determine the similarity between the real-time VAD (VAD_t) and the VAD (VAD_std) determined in the preparation step, and input the similarity into the regression model or the classification model. The similarity may be assessed using various methods for evaluating the similarity of vectors known in the related art.

The learning policy D is a case where the subject is predicted to fail learning by comparing the third brain wave signal with the learning success criterion and the third brain wave signal is equal to or less than the criterion when comparing with the learning state measurement index determined in the preparation step. For example, the third brain wave signal is in a state where not only learning is predicted to fail, but also concentration or the VAD is less than a certain level, and thereby it is evaluated that continuing to learn the current learning content is not efficient. Therefore, in this case, the learning policy D is a policy to change the type or topic itself of the learning content or to request the attention of the subject.

Figure 7:
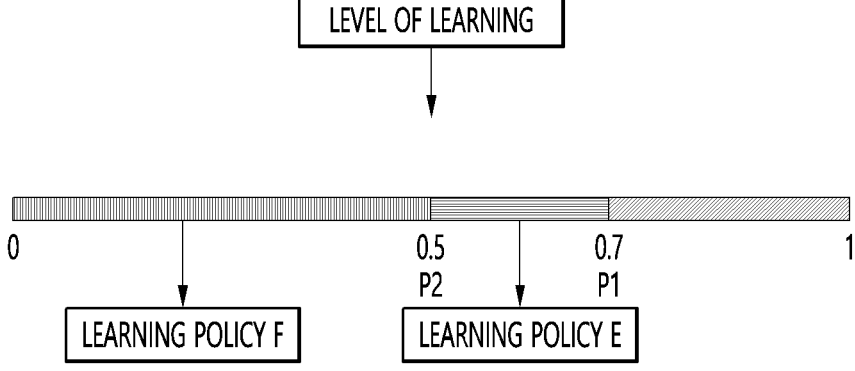
FIG. 7 is a diagram for explaining a learning policy for video-based learning content according to an embodiment of the present disclosure.

With reference to FIG. 7, the learning policy and an embodiment determining the learning policy in the case of video-based learning content will be described. Detailed descriptions of parts that overlap with those described previously will be omitted.

With reference to FIG. 7, learning policies in the case of video-based learning content may be divided into three types.

In the case of video-based learning content, the learning policy may recommend re-learning of the learning content or determine the learning policy to make re-learning essential, based on the results of comparing the level of learning of the subject who receives the learning content with a preset criterion.

For example, the learning policy E may be a policy that recommends re-learning of the learning content presented when the level of learning is lower than a preset criterion P1 and higher than a preset criterion P2. The learning policy F may be a policy that essentially performs re-learning of the learning content presented when the level of learning is lower than both the preset criterion P1 and the preset criterion P2.

In one embodiment, the subject may control the level of re-learning by setting the preset criterion P1 and the preset criterion P2 according to the learning tendency of the subject.

In one embodiment, the level of learning may be evaluated for each subject in each preset section of video-based learning content. In other words, the level of learning of the subject may be evaluated for each subtopic, such as a chapter of video.

The level of learning of the subject may be further based on the probability of learning success, in addition to the concentration (Attn_t) and VAD (VAD_t) determined in real time while learning the learning content used to measure the text-based learning state.

The level of learning may be an output value by inputting the similarity obtained by comparing the scaled value of the concentration (Attn_t) measured while performing the learning content and the VAD (VAD_t) measured while performing the learning content with the VAD (VAD_std) of the learning state measurement index into the classification model or the regression model, and additionally inputting the learning success probability into the classification model or the regression model.

The probability of learning success may be the output value of the classification model, the regression model, or the learning model based on deep learning, which receives the preprocessed value of the third brain wave signal or the specific feature value of the third brain wave signal, and outputs it with a probability between 0 and 1.

For example, based on scores of performing a plurality of test contents, the maximum score is labeled as 1, the minimum score is labeled as 0, and the output value of the learning model trained with the brain wave signals may be labeled between 0 and 1 depending on the score.

In other words, in the case of video-based learning content, it is difficult to evaluate learning success or failure in both ends, so this may be probabilized and used to evaluate the level of learning, and the learning policy of the learning content may be determined.

The classification models, the regression models, and the learning model may be stored in the memory 130 to be used.

The present disclosure described above may be implemented as computer-readable code on a program-recorded medium. Computer-readable media includes all types of recording apparatuses that store data that may be read by a computer system. Examples of the computer-readable media include HDD (Hard Disk Drive), SSD (Solid State Disk), SDD (Silicon Disk Drive), ROM, RAM, CD-ROM, magnetic tape, floppy disk, optical data storage apparatus, etc. Additionally, the computer may include a processor for each apparatus.

Meanwhile, the program may be specially designed and configured for the present disclosure, or may be known and usable by those skilled in the art of computer software. Examples of programs may include not only machine language code such as that created by a compiler, but also high-level language code that may be executed by a computer using an interpreter or the like.

In the specification (particularly in the claims) of the present disclosure, the use of the term "the" and similar referential terms may refer to both the singular and the plural. In addition, when a range is described in the present disclosure, the range includes inventions that apply individual values within the range (unless there is a statement to the contrary), and each individual value constituting the range is as that described in the detailed description of the invention.

Unless there is an explicit order or description to the contrary regarding the steps constituting the method according to the present disclosure, the steps may be performed in any suitable order. The present disclosure is not necessarily limited by the order of description of the steps above. The use of any examples or illustrative terms (e.g., etc.) in the present disclosure is merely to describe the present disclosure in detail, and unless limited by the claims, the scope of the present disclosure is not limited by the examples or illustrative terms. In addition, those skilled in the art will recognize that various modifications, combinations and changes may be made according to design conditions and factors within the scope of the appended claims or their equivalents.

Therefore, the spirit of the present disclosure should not be limited to the above-described embodiments, and the scope of the claims described below as well as all scopes equivalent to or equivalently changed from the claims are within the scope of the spirit of the present disclosure.

What is claimed is:

1. An operation method for a learning support apparatus, which is performed by a processor, the operation method comprising:

measuring a first brain wave signal in a resting state of a subject, and measuring a second brain wave signal in a learning state of test content;

determining a learning state measurement index of the subject based on the second brain wave signal;

determining a learning success criterion of the subject based on the second brain wave signal classified into learning success and learning failure for the test content of the subject;

measuring a third brain wave signal of the subject while learning content is provided to the subject; and determining a learning policy for the learning content based on a result of analyzing the third brain wave signal using learning success criterion and the learning state measurement index, wherein the process of determining the learning policy comprises:

predicting whether the subject succeeds in learning in the learning content based on the result of analyzing the third brain wave signal using the learning success criterion;

evaluating a learning state of the subject in learning in the learning content based on the result of analyzing the third brain wave signal of the subject using the learning state measurement index in response to predicting that the subject fails to succeed in learning in the learning content and a total number of predicted failures for the learning content is higher than a preset criterion; and increasing a provision ratio of the learning content in a total learning contents in response to the learning state being higher than a second preset criterion, and determining the learning policy to store the learning content as an important list.

2. The operation method for a learning support apparatus of claim 1, wherein the learning content is text-based and the process of determining a learning policy comprises:

determining the learning policy to decrease a provision ratio of the learning content in total learning contents or increase a difficulty of the total learning contents when the success is predicted to be successful.

3. The operation method for a learning support apparatus of claim 1, wherein the process of determining a learning policy comprises:

determining the learning policy to increase a provision ratio of the learning content in total learning contents or decrease a difficulty of the total learning contents when the success is predicted to be failed and a total number of predicted failures for the learning content is less than a first preset criterion.

4. The operation method for a learning support apparatus of claim 1, wherein the learning state measurement index and the learning state are determined based on a concentration of the subject and an emotional state of the subject (VAD value).

5. The operation method for a learning support apparatus of claim 1, wherein the learning content is video-based . . . and the process of determining a learning policy comprises:

predicting a probability of success in learning in the learning content based on the result of analyzing the third brain wave signal using the learning success criterion;

evaluating a learning state of the subject in learning in the learning content based on the result of analyzing the third brain wave signal of the subject using the learning state measurement index;

evaluating a level of learning for the learning content based on the probability of success and the learning state; and determining the learning policy to perform re-learning of the learning content based on the level of learning.

6. The operation method for a learning support apparatus of claim 5, further comprising:

evaluating the level of learning for each preset section of the video-based learning content and determining a section to recommend re-learning.

7. The operation method for a learning support apparatus of claim 5, wherein the determining of the learning policy to perform re-learning of the learning content includes determining the learning policy to recommend re-learning of the learning content or essentially perform re-learning based on a result obtained by comparing the level of learning with third and fourth preset criterions.

8. A learning support apparatus comprising:

a processor; and a memory electrically connected to the processor and storing at least one code executed by the processor, wherein when the memory is executed through the processor, the processor measures a first brain wave signal in a resting state of a subject, and measures a second brain wave signal in a learning state of test content, determines a learning state measurement index of the subject based on the second brain wave signal, determines a learning success criterion of the subject based on the second brain wave signal classified into learning success and learning failure for the test content of the subject, measures a third brain wave signal of the subject while learning content is provided to the subject, and stores a code causing to determine a learning policy for the learning content based on a result of analyzing the third brain wave signal using learning success criterion and the learning state measurement index, wherein the learning content is text-based and in the process of determining the learning policy, the processor is configured to:

predict whether the subject succeeds in learning in the learning content based on the result of analyzing the third brain wave signal using the learning success criterion;

evaluate a learning state of the subject in learning in the learning content based on the result of analyzing the third brain wave signal of the subject using the learning state measurement index in response to predicting that the subject fails to succeed in learning in the learning content and a total number of predicted failures for the learning content is higher than a preset criterion; and increase a provision ratio of the learning content in a total learning contents in response to the learning state being higher than a second preset criterion, and determine the learning policy to store the learning content as an important list.

* * * * *